(12) United States Patent
Roberge et al.

(10) Patent No.: US 9,950,876 B2
(45) Date of Patent: Apr. 24, 2018

(54) DOWNWARD ELBOW WITH CYCLONIC EFFECT AND PRODUCT OVERFLOW CAPABILITY

(71) Applicant: CNH Industrial Canada, Ltd., Saskatoon (CA)

(72) Inventors: Martin J. Roberge, Saskatoon (CA); Graham Douglas Stuart, Glaslyn (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 409 days.

(21) Appl. No.: 14/497,844

(22) Filed: Sep. 26, 2014

(65) Prior Publication Data
US 2016/0090019 A1    Mar. 31, 2016

(51) Int. Cl.
*B65G 53/14*     (2006.01)
*B60P 1/60*     (2006.01)
*B65G 53/42*     (2006.01)

(52) U.S. Cl.
CPC .............. *B65G 53/14* (2013.01); *B60P 1/60* (2013.01); *B65G 53/42* (2013.01)

(58) Field of Classification Search
CPC .......... B60P 1/60; B60P 3/2245; B65G 53/00; B65G 53/04; B65G 53/10; B65G 53/14; B65G 53/16; B65G 53/50; B65G 53/52; B65G 53/42; B65G 53/58; B65G 69/06; B65G 69/0491; B65D 88/72; B65D 88/548; A01C 7/042; A01C 7/08; A01C 7/081; A01C 7/082; A01C 7/085; A01C 7/20; A01C 7/206; A01C 15/00; A01C 15/003; A01C 15/006; A01C 7/084; B05B 7/0081; B05B 7/0087; B05B 1/14; B05B 1/34

See application file for complete search history.

(56) References Cited

U.S. PATENT DOCUMENTS

| | | | | |
|---|---|---|---|---|
| 2,743,965 | A | * 5/1956 | Mattson | B65G 69/0491 406/170 |
| 3,070,243 | A | * 12/1962 | Lippke | B60P 1/60 406/105 |
| 3,372,958 | A | * 3/1968 | Black | B65G 53/00 406/109 |

(Continued)

FOREIGN PATENT DOCUMENTS

WO    WO-2014032116 A1 * 3/2014 ............. B65F 1/105

*Primary Examiner* — Glenn F Myers
(74) *Attorney, Agent, or Firm* — Rebecca L. Henkel; Rickard K. DeMille

(57) ABSTRACT

An air system for supplying product to the product tank of an agricultural implement has an air supply and at least one elongated conduit for delivering air entrained product to the tank. There is at least one outlet in the tank formed as a hollow elbow having a generally downwardly directed outlet, a generally upwardly directed outlet and a transverse inlet coupled to the conduit. The elbow includes an upper generally cylindrical region comprising a cyclone chamber for swirling the incoming air entrained product directing at least a portion of the air flow upwardly toward the upwardly directed outlet while allowing the product to fall in a generally helical pattern through a generally frusto-conical region, whereby material migrates downwardly and air upwardly releasing the material to fall in a gentle spiral and air to exit from the upper region of the tank.

9 Claims, 5 Drawing Sheets

(56) References Cited

U.S. PATENT DOCUMENTS

| | | | | |
|---|---|---|---|---|
| 3,917,354 A * | 11/1975 | Adams, Jr. | ............ | B65D 88/548 |
| | | | | 222/143 |
| 4,163,726 A * | 8/1979 | Wilson | ...................... | F16K 3/03 |
| | | | | 210/512.1 |
| 4,187,615 A * | 2/1980 | Iwata | ....................... | A41G 9/00 |
| | | | | 34/250 |
| 6,668,738 B2 * | 12/2003 | Lee | ........................ | A01C 7/081 |
| | | | | 111/174 |
| 6,715,705 B2 * | 4/2004 | Rowley, Jr. | ............ | F26B 17/107 |
| | | | | 241/19 |
| 7,736,409 B2 * | 6/2010 | Rowley, Jr. | ............ | B01D 45/16 |
| | | | | 209/143 |
| 8,534,208 B2 * | 9/2013 | Georgison | ............. | A01C 7/081 |
| | | | | 111/176 |

* cited by examiner

DOWNWARD ELBOW WITH CYCLONIC EFFECT AND PRODUCT OVERFLOW CAPABILITY

BACKGROUND OF THE INVENTION

1. Field of the Invention

The present invention relates to farm implements and, more particularly, to an air conveying apparatus for replenishing particulate material such as seed, fertilizer, herbicide or insecticide in one or more tanks of an air seeder or other farm implement.

2. Description of the Related Art

Agricultural material dispensing equipment frequently employs a material tank either supported on the dispensing device or on a supply cart drawn across a field in conjunction with the dispensing device. Such arrangements are encountered on fertilizer spreaders, planters, air seeders, etc. Periodic replenishment of the material supply in the tank is required.

One typical replenishing technique employs a screw auger or belt conveyor which feeds the material from a source such as a supply vehicle to the tank. Grain augers, conveyor belts and similar mechanical seed handling equipment may cause damage to certain types of seeds.

Such damage is significantly reduced by employing an air conveying system, for example, as shown in U.S. patent application Ser. No. 14/301,717 filed Jun. 11, 2014, where an air flow, either from an air cart fan or from a dedicated pneumatic source, is supplied to a material reservoir, such as a seed hopper, where that air flow passes through one or more restrictions to create a region of increased air velocity and reduced air pressure and a so-called venturi effect. The venturi effect essentially creates a suction to minimize the contact friction of particles against the bottom portions of transfer hoses and for ingesting as many particles as possible of agricultural material from the hopper providing an air entrained flow of material. This air flow and material particles are conveyed to the tank where the material is deposited and excess air vented. The air conveying systems significantly reduce seed damage, however, the potential for damage to seeds and other fragile agricultural products remains. Moreover, the products tend to accumulate more in some tank areas than others resulting in a non-uniform product distribution and corresponding non-uniformity of product delivery to the metering system. Multiple outlet locations within the tank ameliorate this problem, however certain drawbacks and problems remain The seeds exit the tubes at high velocity (in order to minimize the filling time of the tank by the operator). The main problem is that the seeds are either hitting the tank walls at high velocity (bouncing violently, which could damage the seeds) or being carried throughout the tank by random vortices. The random vortices disrupt the even filling of the tank. Finally, if the operator wishes to add only a few small bags to the tank, the random filling would mean that some seed meters are not covered properly (or would starve prematurely). This would cause errors during seeding since product could not be distributed evenly.

What is needed in the art is an air conveying system which does not throw seeds abruptly against the tank walls nor create vortices inside the tank, and distributes seeds evenly in the tank.

SUMMARY OF THE INVENTION

The present invention provides an air material delivery system which minimizes agricultural product damage and provides a more uniform distribution of material within an implement tank.

The invention in one form is directed to an agricultural implement with an air system for supplying product to the implement product tank including an air supply and at least one elongated conduit having an inlet near one end for occasionally receiving product from a product supply source and at least one outlet within the tank for delivering product to the tank. There is a venturi region with an air inlet for receiving air flow from the air supply and an outlet coupled to a conduit one end for providing a region of reduced air pressure to draw product from the supply source into the air flow. The one outlet includes a hollow elbow having a generally downwardly directed outlet, a generally upwardly directed outlet and a transverse inlet coupled to the conduit.

The invention in another form is directed to a method of replenishing the supply of a particulate agricultural material in the tank of a pneumatic agricultural material delivery system which includes supplying air from an air flow source to an agricultural material reservoir and passing the supplied air through a restriction to create a region of increased air velocity and reduced air pressure for ingesting agricultural material from the reservoir and providing an air entrained flow of material. The flow of air entrained material is conveyed to the tank and released within the tank at multiple locations spaced apart near the top of the tank by swirling the air entrained material allowing air to move upwardly and material to move downwardly. The downward material movement is in a generally conical helical pattern of gradually diminishing radius of curvature and lessening velocity. The velocity decreases due to friction between the particles and against the wall resulting from a decreasing volume for the same throughput. Excess air is vented from the tank, for example, through an exhaust system as shown in the aforementioned Ser. No. 14/301,717 application.

In a further form, the invention is directed to a nozzle for releasing an air entrained flow of agricultural material within an agricultural implement material supply tank formed as a cyclonic elbow with an upper generally cylindrical region having an upwardly directed outlet, an inlet, and a generally frusto-conical region (a region having the shape of the frustum of a cone). The upper cylindrical region is a chamber for swirling the incoming air entrained product directing at least a portion of the air flow upwardly toward the upwardly directed outlet and away from the chamber while allowing the product to fall in a generally helical pattern into the frusto-conical region.

An advantage of the present invention is seeds are spread properly along the tank in piles in a predictable fill profile.

Another advantage is seed flow into the tank is not limited by the outlet height, whereby tank fill is maximized.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

Figure 1:
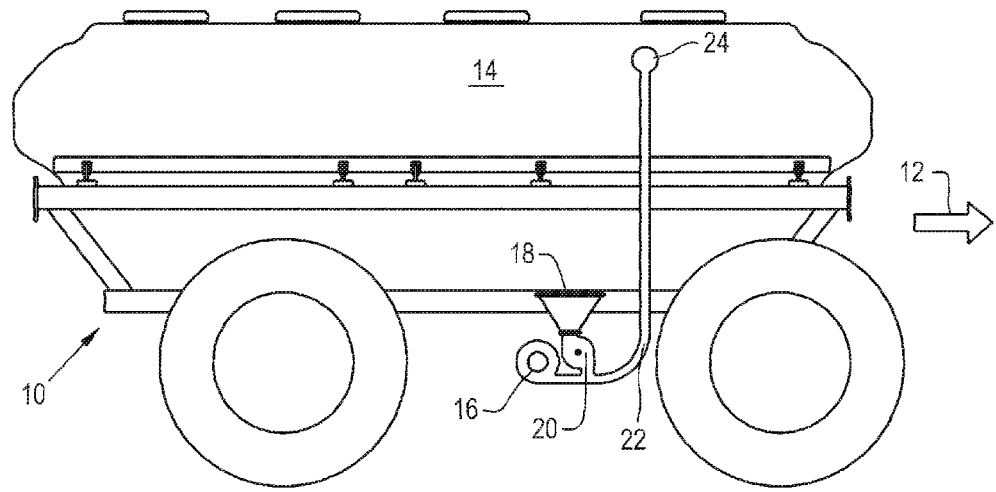
FIG. 1 is a side view of an air cart part of an air seeder equipment, and may include an air conveying system for filling and refilling the cart tank according to the present invention.
Figure 2:
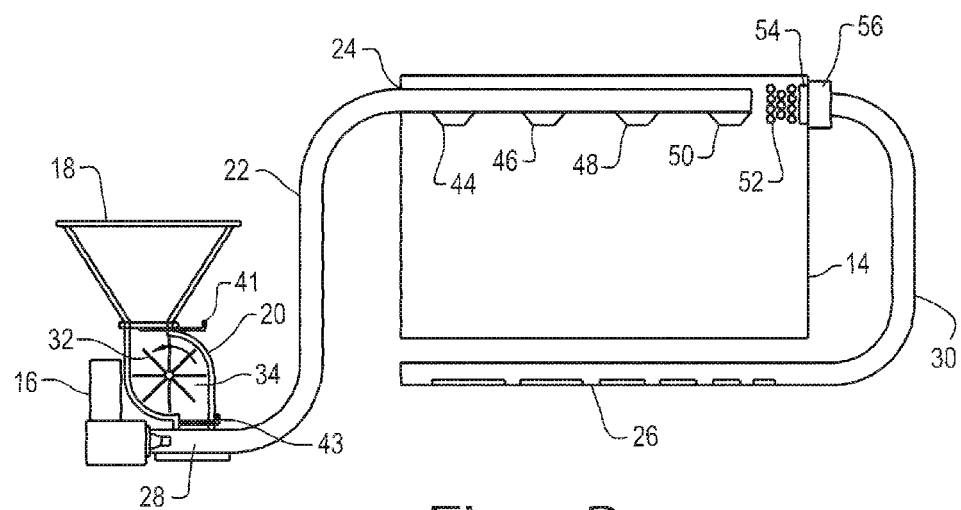
FIG. 2 is a schematic cross-sectional representation of a product supply system incorporation the invention in one form.
Figure 3:
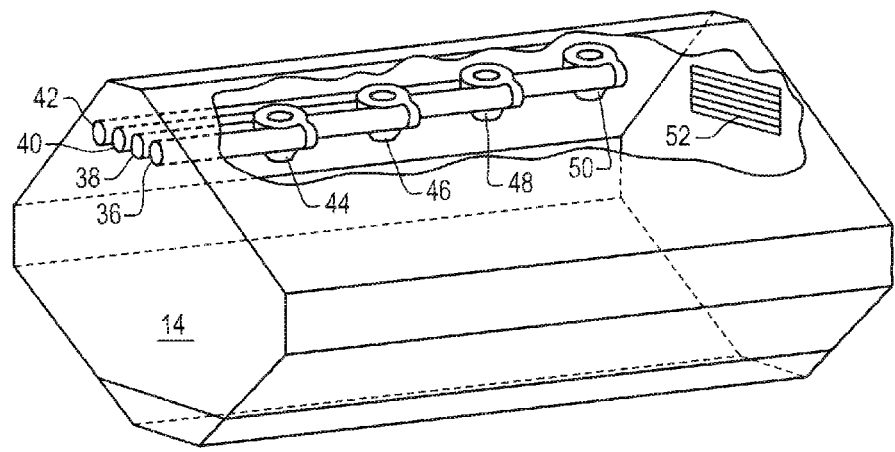
FIG. 3 is an isometric view of an air cart tank with the air conveying cyclonic elbows of FIG. 2 visible therein.
Figure 4:
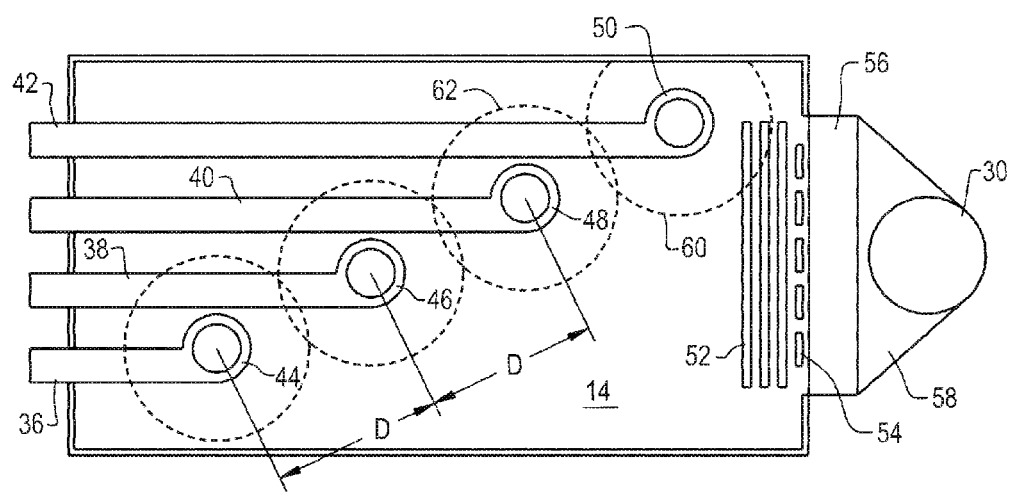
FIG. 4 is a top schematic view of the cyclonic elbow array of FIGS. 2 and 3.
Figure 5:
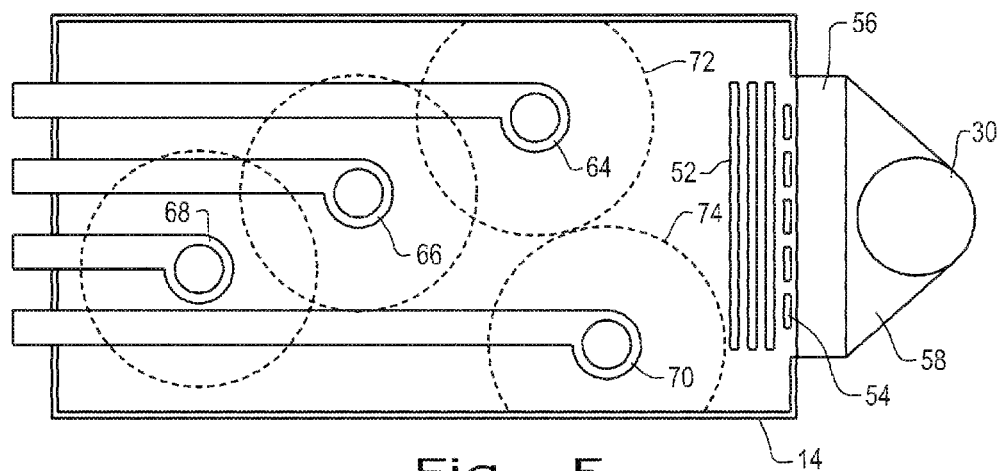
FIG. 5 is a top schematic view similar to FIG. 4, but showing a variation on the cyclonic elbow array.
Figure 6:
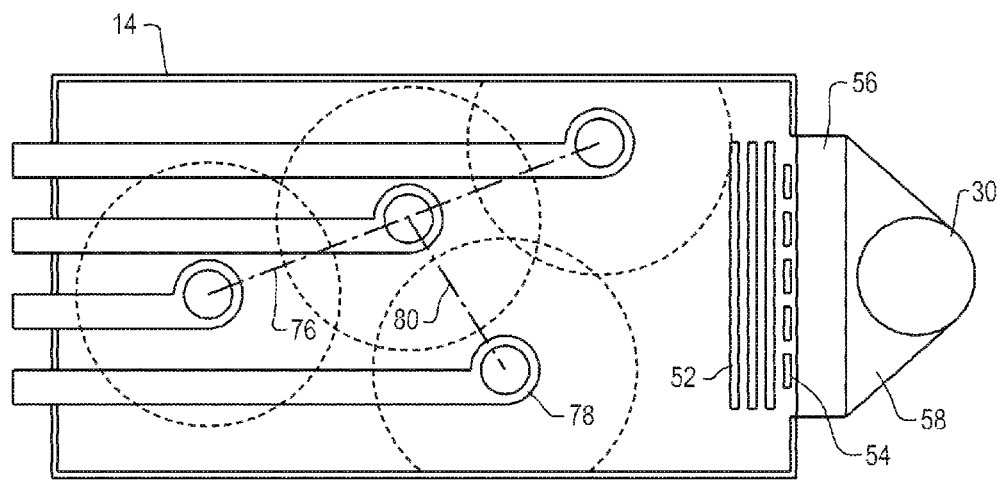
FIG. 6 is a top schematic view similar to FIGS. 4 and 5, but showing another variation on the cyclonic elbow array.

Referring now to the drawings, and more particularly to FIG. 1, there is shown an air cart 10 comprising a portion of a known pneumatic agricultural product delivery system which generally includes a traction unit (not shown) which may be coupled to air cart 10 for towing the air cart 10 in the direction of arrow 12. The system usually includes as a third unit, a utilization implement such as an air drill (not shown) for a seeding, cultivating and/or fertilizing operation. As is known in the art, the air cart 10 has one or multiple large product supply tanks 14 which store a certain quantity of the agricultural product, typically a particulate material, e.g., seed and/or inoculant, or fertilizer, and a metering system that meters the particulate material from the tank or tanks 14 to the air drill. In addition to being mechanically linked with the air drill, the air cart 10 and the air drill are interconnected by an air/product delivery system which includes a plurality of distribution lines. Air is supplied to the product delivery system by a fan assembly or other pneumatic source sometimes mounted adjacent the front of the tank 14 and near the metering unit. Alternately, the fan assembly may be mounted rearward of the tank or adjacent a side of the tank. As known in the art, the fan creates a turbulent air flow that carries particulate material metered by a metering system into and along air/product distribution lines to the utilization implement for applying the air entrained product to an agricultural field.

The supply of particulate material in the tank 14 is occasionally replenished from a supply vehicle. In the past the tanks have been refilled by auger or conveyor systems which may cause damage to fragile materials. As shown in U.S. patent application Ser. No. 14/301,717 filed Jun. 11, 2014, these mechanisms have been improved upon by an air material delivery system employing an air flow source such as a dedicated fan 16 and motor. The supply of particulate material in the cart tank 14 is replenished from a hopper 18 which receives material, for example, by gravity flow, from a supply source such as a truck or other delivery vehicle. The material passes through a rotary feeder or air lock mechanism 20, and passes upwardly through hose 22 and, from tank inlet 24, into the tank 14. When the material in tank 14 requires replenishing, a supply source such as the agricultural material reservoir or hopper 18 provides, by way of an air lock or rotary feeder 20, a material flow to be mixed with the air passing into the venturi region 28. (FIG. 2). The air entrained material is then conveyed by conduit 22 from a venturi region outlet to replenish the material in the tank 14. The material particles settle in the tank and exhaust air flows through conduit 30 to the diffuser 26.

FIG. 2 illustrates some details of the rotary feeder and air lock 20 and venturi region 28. The rotary feeder or air lock portion has a cylinder 32 rotatable about an axis in a counter-clockwise direction as shown by the arrow in FIG. 3. The cylinder 32 has a plurality of wedge-shaped pockets such as 34 which take on product from the hopper 18 when opening upwardly and release product downwardly into the venturi region after about one-half revolution. The cylinder fits within cylindrical sidewalls sufficiently closely to prevent any significant air or material passage. At around a five o'clock position, the material falls from the wedge shaped segments and is funneled by seed ramps into the venturi region 28 below. A pair of slide valves 41 and 43 may optionally be included.

As seen by comparing FIGS. 2 and 3, hose 22 actually comprises four inlet tubes 36, 38, 40 and 42 which extend different distances into the tank 14. At the end of each tube is located an elbow 44, 46, 48 and 50. These are not simply elbows for redirecting the horizontal air entrained material flow to vertical, rather they are a specialized configuration for inducing a swirling motion to the flow at multiple spaced apart locations near the top of the tank by swirling the air entrained material allowing air to move upwardly and material to move downwardly. The downward material movement is in a generally conical helical pattern of gradually diminishing radius of curvature and lessening velocity. Excess air is vented from the tank through a porous media grid such as a set of staggered parallel cylindrical rods 52 to minimize the probability of canola seeds or other product from reaching a vertical sieve or screen 54. A rotary valve 56 selectively allows or prevents air from exiting the tank. Closing this valve pressurizes the tank and aids the normal product distribution process while opening the valve facilitates air egress while refilling the tank. The valve may have brushes on the perimeter which rub against the screen thereby cleaning the screen each time the valve is opened or closed. The valve 56 could also be located near the bottom of tube 30 closer to the diffuser.

FIGS. 2, 3 and 4 illustrate tank 14 as viewed from the front of an air cart, an isometric view, and a top view respectively. In FIG. 4, the outlet nozzles or cyclones are offset and generally in alignment diagonally across the tank. FIG. 4 also shows an exhaust plenum 58 connecting with hose 30 leading to the diffuser 26. The material being conveyed to the tank exits a nozzle at minimal vertical velocity and spreads as it falls producing a dispersed coverage indicated generally by circles such as 60 and 62. Of course these circles are simply illustrative since the pile of material dispensed increases in radius as the tank fills and the piles merge together during filling. In FIG. 4, the distance from any one nozzle to its nearest neighbor is substantially the same as for any other nozzle. For example, the distance D from nozzle 44 to nozzle 46 is the same as the distance D from nozzle 48 to nozzle 46.

In FIG. 5, three nozzles or cyclones 64, 66 and 68 are equally spaced along a straight line providing a minimum overlap of dispensed material while one cyclone 70 is off at the end to better fill one corner with material. The coverage is somewhat more complete as seen by the dispersion circles such as 72 and 74.

In FIG. 6 there is a straight line 76 joining three nozzles or cyclones while the fourth nozzle 78 lies generally on the perpendicular bisector 80 of this line segment. The distance from any cyclone to its nearest neighbor in FIG. 6 is the same to maximize the range of each cyclone.

Figure 7:
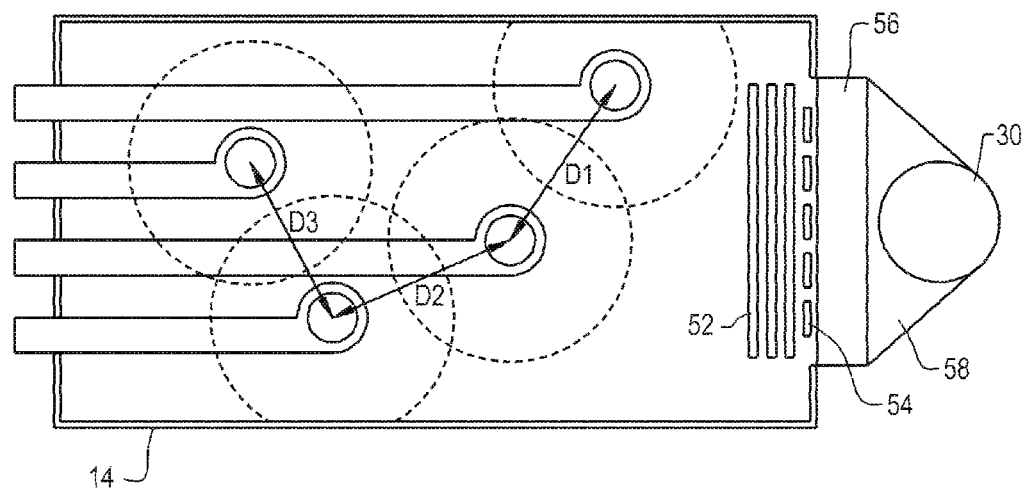
FIG. 7 is a top schematic view similar to FIGS. 4-6, but showing a further variation on the cyclonic elbow array.
Figure 8:
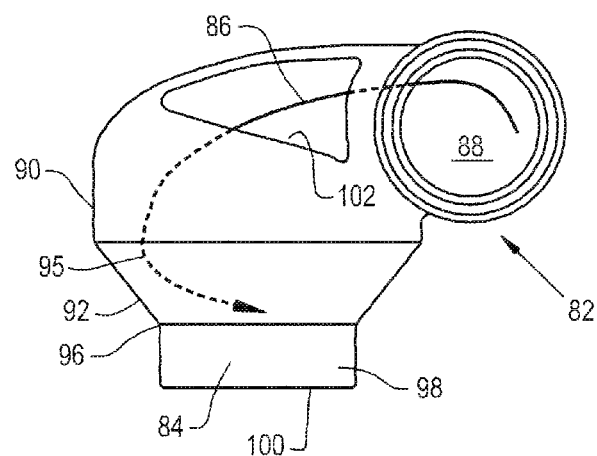
FIG. 8 is a front view of the cyclonic elbow of FIGS. 2-7.
Figure 9:
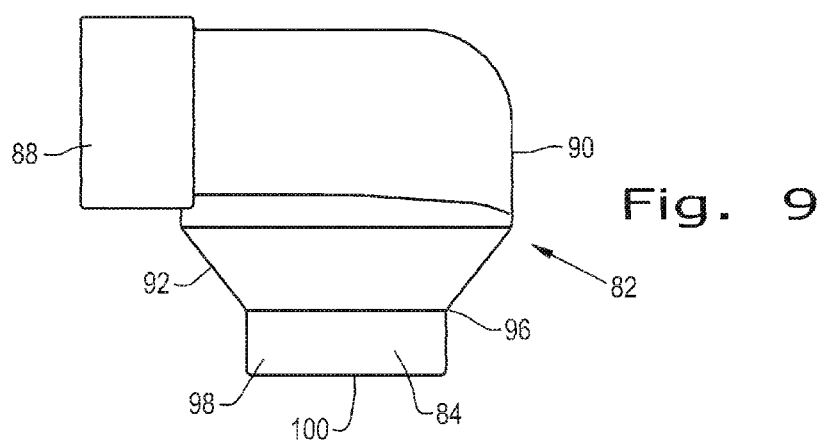
FIG. 9 is a side view of the cyclonic elbow of FIG. 8 from the right side thereof.
Figure 10:
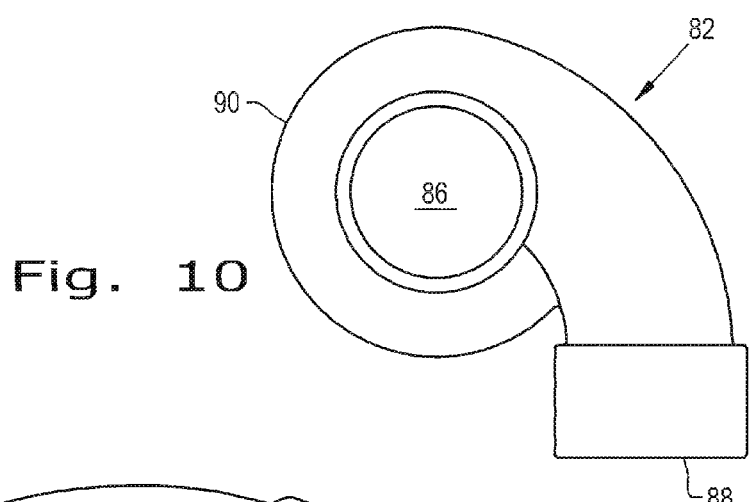
FIG. 10 is a top view of the cyclonic elbow of FIGS. 8 and 9.
Figure 11:
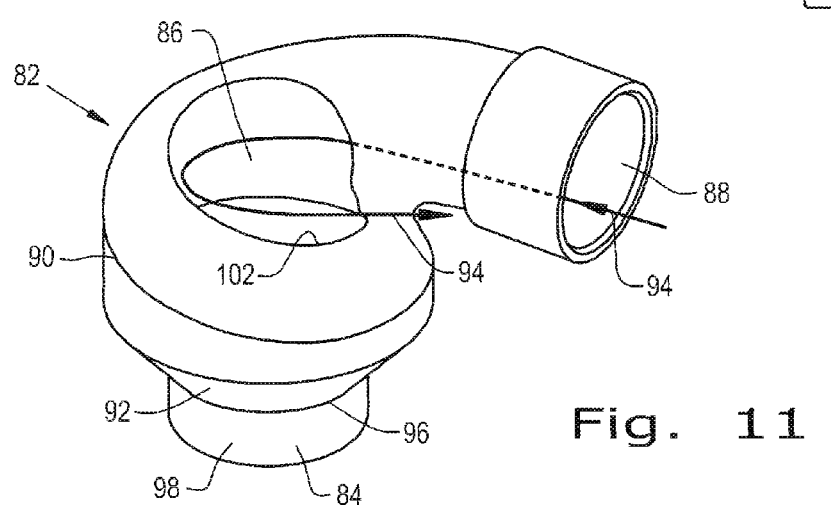
FIG. 11 is an isometric view of the cyclonic elbow of FIGS. 8-10.

Finally, FIG. 7 shows the cyclones disposed in a zigzag pattern. Again, the distances D1, D2 and D3 are all substantially the same. Each of the patterns of cyclone arrays has generally the same goal: to uniformly dispense material throughout the tank. Other arrays with the same or a greater or lesser number of cyclones are easily imagined.

Each of the outlet nozzles or cyclones is generally formed as a hollow elbow. FIGS. 8-11 illustrate the details of one nozzle for releasing the air entrained flow of agricultural material within an agricultural implement material supply tank. All the outlet nozzles within the tank are similar. Each is formed as a hollow cyclonic elbow 82 having a generally downwardly directed outlet 84, a generally upwardly directed outlet 86 and a transverse inlet 88 coupled to a corresponding conduit, e.g., 36 for receiving the air entrained material flow from the hopper 18. There is an upper generally cylindrical region 90 which includes the upwardly directed outlet 86 as well as the inlet 88, and a generally frusto-conical intermediate region 92. The upper cylindrical region comprises a cyclone chamber for swirling the incoming air entrained product directing at least a portion of the air flow (represented by arrow 94) upwardly toward the upwardly directed outlet and away from the chamber while allowing the product to fall (represented by arrow 95) in a generally helical pattern into the frusto-conical region 92. The smaller bottom end 96 of the frusto-conical region blends into a lower generally cylindrical region 98 extending downwardly there from. The cylindrical region 98 has a radius less than the radius of the upper cylindrical region 90 and an outlet 100 near the lower end thereof from which material may fall gently in the tank.

The upper cylindrical region has the inlet positioned off center whereby the air entrained product flow enters the cylindrical region generally tangentially to a cylindrical region sidewall. The inlet is approximately circular in cross-section with a radius about one-half the radius of the generally upper cylindrical region. In one embodiment, the frusto-conical portion diverged from the vertical axis by about 140 degrees. Further, the cross-sectional area of the elbow inlet is less than the cross-sectional area of either of the elbow outlets. Finally, it will be noted that the lowermost portion of the upwardly directed outlet is higher than the lowermost portion of the transverse inlet and the uppermost portion of the upwardly directed outlet is lower than the uppermost portion of the transverse inlet.

The behavior of the nozzle in separating air from material may be explained by considering the circulation within the cyclonic elbow 82 as a closely wound helix having a pitch approximately the same as the diameter of the inlet 88 opening. Of course, this is not strictly correct since the air/material mixture velocities and the distribution within the helix vary significantly. The mixture enters tangentially to the upper cylindrical portion 90 and is diverted into the helical pattern by the cylindrical portion sidewall. As the material/air mixture circulates, the agricultural material migrates toward the lower portion of the flow. When the flow reaches the lip 102, the upper air-rich portion is diverted upwardly as flow 94 and material continues to spiral downwardly at a diminishing velocity and reduced radius as flow 95.

In operation, the supply of a particulate agricultural material in the tank of a pneumatic agricultural material delivery system is replenished as needed by supplying air from an air flow source to an agricultural material reservoir and passing that air through a restriction to create a region of increased air velocity and reduced air pressure to ingest material from the reservoir providing an air entrained flow of material. This flow is conveyed to the tank where it is released at multiple spaced apart locations near the top of the tank by swirling the flow allowing air to move upwardly and material to move downwardly. The multiple release locations are generally uniformly spaced apart and located at approximately the same elevation near the top of the tank to optimize product distribution within the tank. Swirling is achieved by funneling downward material movement in a generally conical helical pattern of gradually diminishing radius of curvature and lessening velocity. Excess air is vented from the tank. If the material level in the tank reaches the lower outlet, air and seed continue to flow exiting the elbow through the upper outlet. When the bottom of the elbow is in contact with the seed pile and the bottom cylindrical section fills up, the helix will eventually fill and the air and particles will exhaust out the top of the elbow.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural implement having a pneumatic source for supplying a flow of air entrained agricultural product from a product tank to be applied by a utilization implement to an agricultural field, including an air system for supplying product to the product tank, the air system comprising:
   an air supply;
   at least one elongated conduit including therein a plurality of inlet tubes, each inlet tube having an inlet near one end for occasionally receiving agricultural product from an agricultural product supply source and each of the plurality of inlet tubes having at least one outlet within the tank for delivering agricultural product to the tank;
   a venturi region positioned adjacent each inlet of each of the plurality of inlet tubes of the at least one elongated conduit, the venturi region having an air inlet for receiving air flow from the air supply and an outlet operably coupled to each inlet of each of the plurality of inlet tubes for providing a region of reduced air pressure to draw agricultural product from the supply source into the air flow; and
   a plurality of hollow elbows, each of the plurality of hollow elbows forming a nozzle and one of each of the plurality of hollow elbows coupled to each outlet of each of the plurality of inlet tubes, each hollow elbow including a transverse inlet coupled to the outlet of each inlet tube to receive the air entrained agricultural product and an adjacent first upwardly directed outlet, the transverse inlet and the first upwardly directed outlet each positioned at an upper end of each hollow elbow, and a second downwardly directed outlet positioned at a bottom end of each hollow elbow, through which the air entrained agricultural product exits,
   wherein the plurality of inlet tubes of the at least one elongated conduit are each spaced-apart so that each inlet tube is a different length such that each nozzle on each of the plurality of hollow elbows is spaced apart both longitudinally and transversely from each other, and wherein the plurality of hollow elbows are located at approximately the same elevation near the top of the tank and generally uniformly spaced from one another to optimize agricultural product distribution within the tank.

2. The agricultural implement of claim 1, wherein the cross-sectional area of each inlet of each of the plurality of hollow elbows is less than the cross-sectional area of either of the first elbow outlet or the second elbow outlet of each of the plurality of hollow elbows.

3. The agricultural implement of claim 1, wherein the lowermost portion of the first upwardly directed outlet of each of the plurality of hollow elbows is higher than the lowermost portion of the transverse inlet of each of the plurality of hollow elbows, such that there is a horizontal alignment of at least a portion of the first upwardly directed outlet and the transverse inlet.

4. The agricultural implement of claim 1, wherein the uppermost portion of the first upwardly directed outlet of each of the plurality of hollow elbows is lower than the uppermost portion of the transverse inlet of each of the plurality of hollow elbows.

5. The agricultural implement of claim 1, wherein each hollow elbow of the plurality of hollow elbows comprises an upper generally cylindrical region and a downwardly directed generally frusto-conical region, the upper cylindrical region comprising a cyclone chamber for swirling the incoming air entrained agricultural product directing at least a portion of the air flow upwardly toward the upwardly directed outlet and away from the chamber while allowing the agricultural product to fall in a generally helical pattern into the frusto-conical region.

6. The agricultural implement of claim 5, wherein each transverse inlet of each of the plurality of hollow elbows is positioned off center of the upper cylindrical region whereby the air entrained agricultural product flow enters the cylindrical region generally tangentially to a cylindrical region sidewall.

7. The agricultural implement of claim 5, wherein each hollow elbow of the plurality of hollow elbows further includes a lower generally cylindrical region, whereby agricultural product falls at a gradually diminishing velocity through the frusto-conical region along a generally helical pattern of diminishing radius of curvature and through the lower generally cylindrical region into the product tank.

8. The agricultural implement of claim 1, wherein horizontal separation of each of the plurality of hollow elbows is approximately the same.

9. The agricultural implement of claim 1, further including an exhaust air system for venting excess air from the tank having an inlet near the top of the tank.

* * * * *